United States Patent [19]

Lee et al.

[11] 4,429,082

[45] Jan. 31, 1984

[54] FILM-FORMING RESINS CONTAINING ALKOXY SILANE GROUPS

[75] Inventors: Kyu-Wang Lee, Danville, Calif.; John R. Peffer; Robert Piccirilli, both of Pittsburgh, Pa.; Wen-Hsuan Chang, Gibsonia, Pa.

[73] Assignee: PPG Industries, Inc., Pittsburgh, Pa.

[21] Appl. No.: 376,329

[22] Filed: May 10, 1982

[51] Int. Cl.$^3$ .................................. C08F 283/04
[52] U.S. Cl. ........................... 525/426; 525/431; 525/446; 525/454; 528/26; 528/28; 528/29; 556/411; 556/418; 556/419; 556/425; 556/450; 556/453; 556/455
[58] Field of Search ................ 528/26, 28, 29; 556/411, 418, 419, 425, 450, 453, 455; 525/426, 431, 446, 454

[56] References Cited

U.S. PATENT DOCUMENTS

| | | | |
|---|---|---|---|
| 3,170,891 | 2/1965 | Speier | 260/37 |
| 3,632,557 | 1/1972 | Brode et al. | 260/77.5 TB |
| 3,963,771 | 6/1976 | Robson et al. | 260/482 R |
| 3,979,344 | 9/1976 | Bryant et al. | 260/18 TN |
| 4,026,826 | 5/1977 | Yoshida | 528/26 |
| 4,067,844 | 1/1978 | Barron et al. | 260/37 N |
| 4,122,074 | 10/1978 | Pepe et al. | 526/26 |
| 4,146,585 | 3/1979 | Ward et al. | 260/827 |
| 4,222,925 | 9/1980 | Bryant et al. | 260/37 N |
| 4,345,053 | 8/1982 | Rizk et al. | 525/440 |

OTHER PUBLICATIONS

Dow Corning Product Bulletin, "New Product Information, Dow Corning 531 Fluid".

*Primary Examiner*—Melvyn I. Marquis
*Attorney, Agent, or Firm*—Linda Pingitore; Charles R. Wilson

[57] ABSTRACT

Ungelled reaction products of a condensation product with an amino silane are formed. The products are capable of curing at a low temperature to form durable coatings. Polyols can optionally be blended with the ungelled reaction products to provide useful coating compositions.

44 Claims, No Drawings

FILM-FORMING RESINS CONTAINING ALKOXY SILANE GROUPS

BACKGROUND OF THE INVENTION

The subject invention relates to film-forming resins capable of low-temperature cure. More particularly, the invention relates to film-forming resins capable of curing through alkoxy silane groups and coating compositions containing the film-forming resin and, optionally, polyols.

In recent years, the coatings industry has become increasingly interested in low-temperature cure coating compositions. These compositions must be capable of being applied by conventional techniques such as spraying, dipping, roll-coating, brushing, etc., yet be capable of curing at a low temperature, ideally room temperature. Obviously, the primary advantage of these compositions is the lessened energy demands.

The coatings industry has also become interested in low organic solvent-containing coating compositions. Such compositions must also be capable of application by conventional techniques. These coating compositions present several advantages including high film build per application, economy of materials, especially in organic solvents which are lost to ambient surroundings, lessened concerns about pollution problems caused by the evaporation of organic solvents and also energy savings since less air needs to be heated to evaporate the solvents in a curing oven. Additionally, the organic solvents themselves have been in short supply.

Much work has been expended in the coatings industry to formulate coating compositions which contain a low organic solvent content. One area in particular which has received attention has been in the formulation of water-based coating compositions. Water is itself, of course, quite inexpensive and does not pose environmental problems. However, film-forming resins which are capable of being reduced with water are themselves normally water-sensitive and do not provide a film having all the desired characteristics, such as humidity resistance and durability. Still another area of coating technology which has received attention in recent years is the formulation of high solids coating compositions which are of a low viscosity and can be applied by conventional techniques. Such coating compositions can contain what is referred to as reactive diluents. These reactants are capable of thinning the coating composition and then reacting with the film-forming resins after application to a substrate. In effect, the diluent becomes a part of the cured film.

Additionally, there have been formulated coating compositions which are capable of curing at a low temperature and which are low in organic solvent content. However, the known compositions all have one or more drawbacks associated with them. Thus, for example, coating compositions based on alkyd resins are slow to cure to a film and the cured film often does not have particularly good properties. One pack and two pack isocyanate-containing coating compositions suffer from health concerns associated with the isocyanate. Compositions based on a melamine cure also pose a possible health concern due to the liberation of some formaldehyde during the compositions' cure. Epoxy and amine-containing coating compositions have the disadvantage of having to be a two pack system and the films produced from them are often less durable than desired.

While the above areas of endeavor have produced certain desired results, there is still a need for a new generation of coating compositions. These coating compositions would be capable of curing at a low temperature. Additionally, the coating compositions would ideally require low levels of organic solvents, be one-package stable, and be capable of application to a substrate by conventional techniques. There have now been found film-forming resins which are capable of curing at low temperature and which do not require high levels of organic solvents to achieve application viscosity. These film-forming resins can be applied to a substrate and form a durable film. Components such as polyols and crosslinking agents can be blended with the new film-forming resins to provide additional coating characteristics.

As used herein, all percents and ratios are by weight unless otherwise indicated.

SUMMARY OF THE INVENTION

Film-forming resins capable of curing at a low temperature are derived from the reaction of (a) a condensation product having at least 2 amine reactive acrylyl residues per molecule with (b) an amino silane of formula

where each X is independently a (1) hydrogen, (2) alkyl, aryl, or cycloalkyl group having from 1 to 10 carbon atoms, or (3)

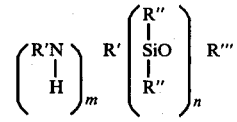

where each R' is independently an alkylene group having from 2 to 10 carbon atoms, m is from 0 to 2, each R" is independently a hydrogen, alkyl, aryl, cycloalkyl, alkoxy, or aryloxy group having from 1 to 8 carbon atoms, n is from 1 to 5 and R''' is an alkyl group having from 1 to 8 carbon atoms, with the proviso at least one X is a radical containing silicon. The reaction product is essentially anhydrous, has a non-vinyl addition backbone, is essentially acrylyl-free and has a silicon content of up to about 12 percent.

The reaction product described above is useful as a major film-forming component in a coating composition or it can be blended with a polyol to further modify film properties. The coating compositions can be cured at low temperatures and preferably can contain a low organic solvent content.

DETAILED DESCRIPTION OF THE INVENTION

This invention relates to film-forming resins having alkoxy silane groups and coating compositions containing the film-forming resin. The novel film-forming resins, as well as coating compositions containing the resins, are described in the following paragraphs.

The reaction products of this invention are characterized as being ungelled, having a non-vinyl addition backbone, being essentially acrylyl-free and having a silicon content of up to about 12 percent. By essentially acrylyl-free is meant the acrylyl residue content of the reaction product is less than about 0.2 milliequivalents per gram.

The ungelled products of the invention are formed from the reaction of an intermediate and an amino silane. The intermediate has a non-vinyl addition backbone which is formed by condensation reaction and has at least 2 amine reactive acrylyl residues per molecule. The condensation product itself can be any of several different suitable materials. Products formed by condensation reactions described herein are intended to encompass products (1) formed from two or more molecules which combine with the separation of water or some other simple substance as well as (2) products which are formed from two or more molecules which combine by other than an addition reaction mechanism but without separation of some simple substance, e.g., an urethane formed from an alcohol and an isocyanate. The amine reactive acrylyl residue as used herein includes the moiety

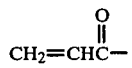

as well as alkyl substituted moities such as

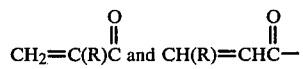

where R is a lower alkyl group having up to 4 carbon atoms. In the description to follow with respect to the intermediate having amine reactive acrylyl residues, reference is made to said residues as being derived from acrylic acid or hydroxyalkyl acrylate. It should be understood the acrylyl residue, in addition to the acrylic acid, can also be derived from other monoethylenically unsaturated carboxylic acids such as methacrylic acid, crotonic acid, ethacrylic acid, itaconic acid, and, in addition to the hydroxyalkyl acrylate, other hydroxyl-containing esters such as hydroxyalkyl methacrylate, or a hydroxyalkylacrylamide. Substitution of any of the aforementioned materials for the acrylic acid or acrylate is readily accomplished and such acrylyl residues derived from these materials is intended to be within the scope of this invention. Preferred acrylyl residues are those of formula

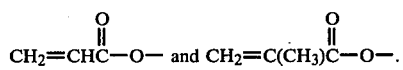

Preferred reaction products of the invention have an acrylyl content of less than about 0.1 milliequivalents (meq.) per gram. More preferred reaction products have an acrylyl content of less than about 0.1 meq. per gram and have a silicon content of from about 0.5 percent to about 10 percent. Especially preferred reaction products have an acrylyl content of less than about 0.01 meq. per gram and have a silicon content of from about 2 percent to about 9 percent.

One suitable class of condensation products which can form the backbone of the subject reaction products is a hydrocarbonpolyol polyacrylate. Such materials can be derived from the reaction of an acrylic acid with a polyhydric material. Polyhydric materials include the aliphatic diols such as ethylene glycol, 1,2-propane diol, 1,3-propane diol, 2,2,4-trimethyl-1,3-pentane diol, 2,2-dimethyl-1,3-propane diol, 1,2-butane diol, 1,4-butane diol, 1,3-butane diol, 1,5-pentane diol, 1,10-decane diol; 2,2-dimethyl-3-hydroxypropyl-2,2-dimethyl-3-hydroxypropionate, and ester diols formed from one mole of a diol and at least one mole of a lactone, e.g., butyrolactone or caprolactone; diols containing a cyclic structure such as 1,4-cyclohexane-dimethanol, p-xylylene glycol, bisphenol A, hydrogenated bisphenol A, and 1,4-cyclohexane diol; triols such as glycerol, trimethylol ethane, trimethylol propane, and 1,2,6-hexane triol; and tetraols such as pentaerythritol. The triols are preferred and the diols are most preferred polyhydric materials. The aforementioned acrylic acid is reacted with the polyhydric material in an essentially equivalent ratio or a slight excess so as to produce a material of the formula:

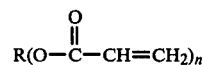

where R is the residue of the polyhydric material and n is at least 2.

Another class of condensation products which can form the backbone of the subject ungelled reaction products can be described as a saturated polyester-polyol polyacrylate. These materials are well known and can be derived from the reaction of a dicarboxylic acid with a polyhydric material which is further reacted with an acrylic acid. Suitable saturated dicarboxylic acids (which for purposes herein are defined to include those dicarboxylic acids where the only unsaturation occurs in the aromatic nuclei) useful in this reaction are adipic acid, sebacic acid, succinic acid, phthalic acid, isophthalic acid and azelaic acid. Unsaturated dicarboxylic acid such as maleic acid, fumaric acid, citraconic acid, and itaconic acid can be used, but only in minor components. Anhydrides of the aforementioned acids, where they exist, are intended to be embraced by the term "acid". Suitable polyhydric materials are described above.

Saturated polyesterpolyol polyacrylates can also be derived from the reaction of a hydroxyalkyl acrylate with lactones. Such adducts or the hydroxyalkyl acrylates, per se, can then be reacted with dicarboxylic acid to give other suitable polyester acrylates. Hydroxyalkyl acrylates wherein the alkyl group contains from 2 to 10 carbon atoms are preferred with examples thereof being 2-hydroxyethyl acrylate, 2-hydroxypropyl acrylate, 3-hydroxypropyl acrylate, 2-hydroxybutyl acrylate, and 6-hydroxynonyl acrylate. Lactones are exemplified by epsilon-caprolactone, epsilonmethylcaprolactone, and butyrolactone.

Alkydpolyol polyacrylates can also form the backbone of the resins of this invention. These acrylates are derived from the reaction of a hydroxyalkyl acrylate (such as described above with respect to the polyester polyol acrylates) with a carboxyl-rich alkyd resin. Alkyd resins are well known and can be considered polyesters of polyhydric materials and polycarboxylic acids chemically combined with various drying, semi-drying and nondrying oils in different proportions. Thus, for example, the alkyd resins are made from polycarboxylic acids such as phthalic acid, isophthalic acid, succinic acid, adipic acid, azelaic acid, sebacic acid as well as from anhydrides of such acids, where they exist. The polyhydric materials which are reacted with the polycarboxylic acid include glycerol, trimethylolethane, trimethylolpropane, pentaerythritol, sorbitol, mannitol, ethylene glycol, diethylene glycol and 2,3-butylene glycol.

The alkyd resins are produced by reacting the polycarboxylic acid and the polyhydric material together with a drying, semi-drying or nondrying oil in proportions depending upon the properties desired. The oils are coupled into the resin molecule by esterification during the manufacturing and become an integral part of the polymer. The oil is fully saturated or predominately unsaturated. The fully saturated oils tend to give a plasticizing effect to the alkyd resulting in durable films, whereas the predominately unsaturated oils tend to cross-link and dry with oxidation to give more cross-linked films. Suitable oils include coconut oil, fish oil, linseed oil, tung oil, castor oil, cottonseed oil, safflower oil, soybean oil, and tall oil. Various proportions of the polycarboxylic acid, polyhydric material and oil are used to obtain alkyd resins of various properties.

Still another class of condensation products are the urethanepolyol polyacrylates. These materials are derived from the reaction of an isocyanate with a hydroxyalkyl acrylate. The isocyanate is a polyisocyanate. Several different polyisocyanates are useful. Examples include aliphatic, cycloaliphatic or aromatic compounds having two or more isocyanate groups. Illustrative compounds are 1,4-tetramethylene diisocyanate; 1,6-hexamethylene diisocyanate; 2,2,4-trimethyl-1,6-diisocyanato hexane; 1,10-decamethylene diisocyanate; 1,4-cyclohexylene diisocyanate; 4,4'-methylene bis-(isocyanato cyclohexane); p-phenylene diisocyanate; isophorone diisocyanate; 4,4'-bisphenylene diisocyanate; 4,4'-methylene bis(diphenyl isocyanate); 1,5-naphthalene diisocyanate; and 1,5-tetrahydronaphthalene diisocyanate. Examples of hydroxyalkyl acrylate compounds reacted with the isocyanate include 2-hydroxyethyl acrylate, 2-hydroxypropyl acrylate, 3-hydroxypropyl acrylate, trimethyolpropane mono-and-diacrylate, and any of the aforedescribed acrylates which has been modified by reaction with a lactone. Generally, equivalent amounts of the hydroxyalkyl acrylates and isocyanates reactants are reacted together. When equivalent amounts of reactants are used, the resultant reaction product has the formula:

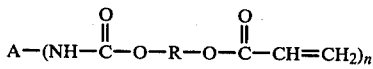

where A is the organic residue from the isocyanate, R is a straight or branched chain alkylene group or an ester-containing linkage, and n is at least 2.

Still additional condensation products are described as polyurethanepolyol polyacrylates. These materials are derived from the reaction of a polyurethane having free isocyanate groups with a hydroxyalkyl acrylate or are derived from a polyurethane having free hydroxyl groups with acrylic acid. The polyurethanes are made by reacting a polyisocyanate (as described above) with a polyhydric material (also as described above). The resultant product is a polyurethane having free isocyanate or free hydroxyl groups dependent on the relative amounts of reactants. Those polyurethanes having free isocyanate groups are reacted with a hydroxyalkyl acrylate, as described above, while those polyurethanes having free hydroxyl groups are reacted with acrylic acid. Less than stoichiometric amounts of the acrylate or acrylic acid can be used so as to have free isocyanate or hydroxyl groups available; however, nearly stoichiometric amounts of reactants are generally preferred. Also, if the isocyanate-containing material is reacted with acrylic acid, the resultant useful product would be an acrylamide with the segment structure

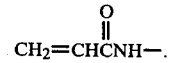

With respect to the production of the urethanepolyol and polyurethanepolyol polyacrylates, the aliphatic isocyanate reactants are used where a film with good weather durability is ultimately desired. Aromatic isocyanates are used as a reactant when tough films and/or low cost films are ultimately desired.

Amidepolyol polyacrylates and polyamidepolyol polyacrylates are additional classes of condensation products useful in making the ungelled reaction products of this invention. One method of obtaining an amide polyol acrylate is by reacting a carboxylic acid, e.g., formic acid with a dialkanolamine and then reacting that product with acrylic acid. The polyamide polyol acrylates are made by reacting a polyamide having carboxyl or carboxylate groups with a hydroxyalkyl acrylate. The polyamides are made by reacting a diamine with a dicarboxylic acid as illustrated in the preparation of the polyester polyol acrylates. The relative amounts of the reactants is adjusted to ensure free carboxy groups.

Etherpolyol polyacrylates which are useful as the backbone of the products of this invention are made by different methods. One method involves reacting an ether-containing polyol with acrylic acid. The ether polyol can be diethylene ether glycol, dipropylene ether glycol, dibutylene ether glycol or can be made by reacting a suitable polyhydric material as described above with a monoepoxide such as butyl glycidyl ether, octyl glycidyl ether, allyl glycidyl ether, phenyl glycidyl ether, 1,2-butylene oxide, and styrene oxide.

Etherpolyol polyacrylates can also be derived from the reaction of (1) an acrylic acid with (2) a polyglycidyl ether of a polyphenol or polyhydric alcohol. Any polyglycidyl ether of a polyphenol or a polyhydric material can be used. Preferred are the polyglycidyl ethers of a polyphenol such as bisphenol A. Other polyglycidyl ethers are obtained by etherification of a polyphenol with epichlorohydrin or dichlorohydrin in the presence of an alkali. The phenolic compound can be 2,2-bis(4-hydroxyphenyl)propane; 4,4'-dihydroxybenzophenone; 1,1-bis(4-hydroxyphenyl)ethane; and 1,5-dihydroxynaphthalene. Similar polyglycidyl ethers of polyhydric alcohols are derived from such polyhydric alcohols as ethylene glycol, diethylene glycol, triethylene glycol, 1,2-propylene glycol, 1,4-butylene glycol, 1,5-pentanediol and trimethylolpropane. Generally, equivalent amounts of the acrylic acid and polyglycidyl ethers are used.

Polyetherpolyol polyacrylates are another example of a class of condensation products useful as the backbone of the subject ungelled reaction products of this invention. One convenient method of making a polyether acrylate is by reacting a polyether polyol with acrylic acid. Examples of polyether polyols include those of structural formula

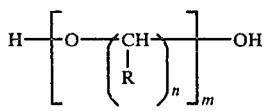

where R is hydrogen or lower alkyl containing from 1 to 5 atoms, n is from 2 to 6 and m is from 3 to 20. Specific examples of these polyether polyols are poly(oxytetramethylene)glycols, poly(oxyethylene)-glycols and poly(oxy-1,2-propylene)glycols. Other useful polyether polyols are formed by oxyalkylation of various polyols such as ethylene glycol, 1,6-hexanediol, bisphenol A, trimethylolpropane, pentaerythritol, sorbitol, and sucrose. One commonly used oxyalkylation method is reacting a polyhydric material with an alkylene oxide, e.g., ethylene oxide or propylene oxide, in the presence of an acidic or basic catalyst.

It should be understood the above description of condensation products is only illustrative of some of the more readily available products useful in this invention. Other condensation products which contain a mix of linkages, e.g., ether and ester linkages, are intended to be within the scope of useful condensation products used to form the ungelled resins. The common characteristic of the condensation products is the presence of at least 2 amine reactive acrylyl residues per molecule—thereby providing a site for the amino silane to react. The physical properties of the resultant ungelled resin are due in large part to the condensation product used as the backbone, with the amino silane providing the alkoxy silane groups and desired curing characteristics. In a similar manner, it should be understood the condensation product can have other groups present, e.g., pendent hydroxyl groups and pendent isocyanate groups, provided they do not cause gelation. Pendent hydroxyl groups in particular are useful because of their contribution towards better cure in the final ungelled resin. Such pendent groups can also contribute favorably towards pigment wetting and other physical properties.

The aforementioned condensation products which form the backbone of the reaction products of this invention are further reacted with an amino silane so as to result in a product having pendent alkoxy silane groups. Several different amino silanes are known and are useful herein. The amino silanes have the formula

where each X is independently a (1) hydrogen, (2) alkyl, aryl, or cycloalkyl group having from 1 to 10 carbon atoms, or (3)

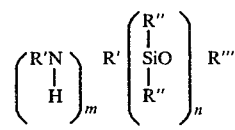

wherein each R' is independently an alkylene group having from 2 to 10 carbon atoms, m is from 0 to 2, each R" is independently a hydrogen, alkyl, aryl, cycloalkyl, alkoxy, or aryloxy group having from 1 to 8 carbon atoms, n is from 1 to 5 and R''' is an alkyl group having from 1 to 8 carbon atoms, with the proviso at least one X is a radical containing silicon. Preferred amino silanes are those having the formula

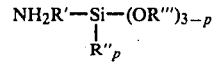

where R' and R''' are as defined above, R" is an alkyl, aryl, alkoxy or aryloxy group, and p is from 0 to 2. Especially preferred amino silanes are those where p is 0 and R' is an alkylene linkage having from 2 to 5 carbon atoms. Examples of these amino silanes are aminoethyltriethyoxysilane, gamma-aminopropyltriethoxysilane, gamma-aminopropylmethyldiethoxysilane, gamma-aminopropylethyldiethoxysilane, gamma-aminopropylphenyldiethoxysilane, N-beta(aminoethyl)gammaaminopropyltrimethoxysilane, delta-aminobutyltriethoxysilane, deltaaminobutylethyldiethoxysilane. Preferred amino silanes are the gamma-aminopropyltrialkoxysilanes.

The aforedescribed reactants are usually readily reacted simply by blending them at room temperature or at a slightly elevated temperature, for example, up to about 100° C. The reaction of an amine group with an acrylyl group which occurs in this invention is often referred to as a Michael addition. Sufficient amounts or an excess of the amino silane is used to insure that the ungelled reaction products have acrylyl contents of less than about 0.2 meq. per gram. Such products are more heat and light stable than greater acrylyl content-containing products. It should be recognized that slowly adding the amino silane to the condensation product results in there being a large excess of acrylate groups to amino silane. Unless the temperature of the reaction mixture is kept sufficiently low, a gelled product can be the result. It is better to add the condensation product to a reaction vessel already containing amino silane to obtain an ungelled reaction product. The reaction is carried out in the absence of a solvent or in the presence of an inert solvent. Any inert solvent can be used that does not interfere with the reaction. Examples of suitable inert solvents are ethanol, toluene, butyl acetate, methyl isobutyl ketone, and ethylene glycol monoethyl ether acetate. It is highly preferred that the reaction be conducted in the absence of moisture or in a controlled amount of moisture to avoid unwanted side reactions and possibly gellation.

Molecular weight of the ungelled reaction products is controlled with the aid of the Flory equation. The reaction of primary amino groups with di- or polyfunctional acrylates can be viewed as a condensation polymerization in which the primary amino group of the amino silane is difunctional with respect to the acrylyl residue on the condensation product. This is demonstrated by the equation below:

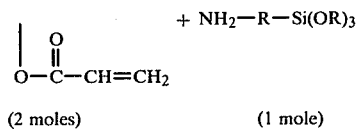

(2 moles)        (1 mole)

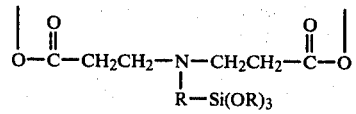

In preparing the ungelled products of the present invention, the Flory equation as modified by Stockmayer can be used as a guide. The equation for calculating the weight average molecular weight ($M_w$) is as follows:

$$\overline{M_w} = \frac{P_B \dfrac{e_i M_i^2 A_i}{e_i f_i A_i} + P_A \dfrac{e_j M_j^2 B_j}{e g_j B_j} + P_A P_A \dfrac{P_A(f_e - 1)M_B^2 + P_B(g_e - 1)M_A^2 + 2 M_A M_B}{1 - P_A P_B(f_e - 1)(g_e - 1)}}{P_B \dfrac{e_i M_i A_i}{e_i f_i A_i} + P_A \dfrac{e_j M_j B_j}{e g_j B_j}}$$

where $A_i$ = moles of $i^{th}$ acrylyl compound with functionality $f_b$; $B_j$ = moles of $j^{th}$ amino silane with functionality $g_b$; $M_i$ = molecular weight of $i^{th}$ acrylyl compound; $M_j$ = molecular weight $j^{th}$ amino silane; $P_B$ = fraction of amino hydrogens reacted, $P_A$ = fraction of acrylyl groups reacted, $M_A$, $M$, $f_e$ and $g_e$ defined as follows:

$$f_e = \frac{e_i f_i^2 A_i}{e_i f_i A_i} \qquad g_e = \frac{e g_i^2 B_j}{e g_i B_j}$$

$$M_A = \frac{e_i M_i f_i A_i}{e_i f_i A_i} \qquad M_B = \frac{e_j M_j R_j B_j}{e g_j B_j}$$

For a detailed study of the theory and principles underlying the above equations, reference is made to Official Digest, January 1964, pages 28–41.

The Stockmayer equation enables one to predict whether a reaction mixture will gel. The equation takes into consideration the total moles and functionality of the amino silane and acrylyl residue. The equation enables one to calculate, based on the amount of acrylate consumed, the weight average molecular weight at a degree of reaction ($P_A$). Thus, the Stockmayer equation can be used as a guide in the practice of the present invention.

This equation accurately gives the molecular weight of products depending on the ratio of amine groups to acrylyl residues assuming these reactant groups are equally reactive and no side reactions can take place. However, this is normally not the case. For example, a small amount of water can result in siloxane formation of the amino silane to give the structure indicated below. Such a diamine would be tetrafunctional

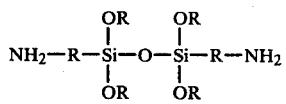

relative to acrylyl residues and would lead to branching and premature gellation not predicted by the Stockmayer equation as expressed above. Also, acrylate polymerization can occur to a small extent leading to higher molecular weight products not predicted by the Stockmayer equation as expressed above. Reactions can also occur between alkoxy silane groups and alcohols thus changing the course of the polymerization. In addition, other amine reactive groups could be present such as free isocyanate which decreases the amount of aminosilane used in the Flory equation. As a result the Stockmayer equation can be used only as a rough guide and the final ratio of reactants must be determined empirically.

If one desires to incorporate less silane functionality pendant to the backbone, a non-silane functional amine such as butyl amine can be used. Thus, the number of crosslinking groups for a given molecular weight can be lowered to achieve softer, more flexible coatings.

The ungelled reaction products of this invention are useful for application to a substrate, per se. The ungelled reaction products in one embodiment of the invention are blended with a low level of a conventional organic solvent (so as to decrease the viscosity of the composition) and/or a pigment and used as such. However, it should be noted that even in the absence of organic solvent the coating composition is capable of application by conventional coating techniques. Typically, the coating compositions consist essentially of from about 30 percent to about 95 percent, preferably from about 40 percent to about 90 percent, more preferably from about 60 percent to about 90 percent of the ungelled reaction product and the balance organic solvent, pigment or a mixture thereof. An organic solvent content of from about 10 percent to about 50 percent is generally used. The applied coating in this embodiment is cured to a durable film by a moisture cure mechanism. That is, moisture found in the atmosphere hydrolyzes the alkoxy silane groups of the ungelled reaction products to silanol groups which are capable of either self-condensing with other silanol groups or reacting with alkoxy silane groups to eventually form a cross-linked polymeric network through formation of siloxane linkages. The kinetics of the curing process are complex and depend on many variables, including humidity and temperature. The nature of the alkoxy silane groups also has an effect on the curing kinetics, it being found lower alkoxy groups hydrolyze more readily than higher or more bulky alkoxy groups. A greater understanding of the type of kinetics involved in the curing process can be had from a reading of Chapter 5-20, page 323 of "The Siloxane Bond", Voronkov, Mileshkevich and Yuzhelevskii, 1978 English Edition, translated by John Livak, published by Consultant Bureau.

Ungelled reaction products described above can also be blended with known film-forming polyols to result in coating compositions which form films which are even more durable and resistant. Generally, coating compositions of this type contain, on a film-forming solids basis, from about 10 percent to about 90 percent, preferably from about 40 percent to about 90 percent, of the ungelled reaction product and from about 10 percent to about 90 percent, preferably from about 10 percent to about 60 percent, of the polyol. The curing mechanism of such compositions primarily involves reaction of the alkoxy silane groups from the ungelled reaction products of the invention with the hydroxyl groups of the polyol to form a cross-linked durable film.

Polyols described above with respect to the formation of an acrylate can be used with the ungelled reaction products. Other suitable polyols are described in U.S. Pat. No. 3,959,201, "High Solids, Water Thinnable Compositions", Chang, in column 4-8 and in U.S. Pat. No. 4,317,894 "Low Temperature Cure Coating Compositions", Lewarchik et al. (the disclosures of which are hereby incorporated by reference). Polyols described in the two patents include polyester polyols, polyether polyols, hydrocarbon polyols, polyamide polyols, polyurethane polyols, cyclic nitrogen-containing polyols, polyurea polyols, and acrylic polyols.

Other film-forming resins can be included in the compositions of this invention to modify or provide desired attributes to a cured coating. For example, conventional cross-linking agents such as aminoplast resins can be included in the polyol-containing compositions. The aminoplast resins of most interest are the condensation products of melamine with an aldehyde, preferably formaldehyde. The melamine-formaldehyde condensation product can be used, per se, or can be etherified with a lower alcohol to produce an alkylated melamine-formaldehyde condensation product. When used, the aminoplast resin represents from about 5 percent.

Coating compositions containing the ungelled reaction products and the organic solvent will optionally also contain pigments, fillers, plasticizers, anti-oxidants, flow control agents, surfactants and other conventional additives. Catalysts, in particular, are included in the compositions at a level ranging from about 0.1 percent to about 5 percent based on the ungelled reaction product and polyol. Conventional catalysts such as the tin naphthenate, tin benzoate, tin octoate, tin dioctoate, tin butyrate, dibutyltin dilaurate, iron stearate, and tetraisopropyl titanate are used. Minor amounts of monoacrylate/aminosilane reaction products can be included in the coating compositions of this invention. The monoacrylate/aminosilane reaction products, when used in a minor amount, are capable of contributing a plasticizing or viscosity reduction effect to the composition without materially affecting the properties of films produced therefrom or, in some cases, impart more durable properties to the coating.

The compositions herein can be applied by conventional coating methods, including brushing, dipping, flow coating, roll coating and spraying. Virtually any substrate, including wood, metals, glass and plastics can be coated with the compositions. Cure of the applied compositions can be effected by moisture (with or without heat) as described above or with a polyol as described below. Those instances where a low temperature cure is desired are most amenable to using the compositions of this invention. Thus, ambient temperature is sufficient for effecting a cure provided a cure period of up to two days can be tolerated prior to achieving a coating having its essentially fully developed properties. It should be noted, though, if when cured at ambient temperatures the coating is dry to the touch after only a few hours. A more fully developed cure in the coating can be achieved by applying heat, with less than about 150° C. being sufficient, and preferably less than about 50° C. being sufficient.

The examples which follow are illustrative of the herein described invention.

EXAMPLE 1

A reaction vessel is initially charged with 265.2 parts of gamma-aminopropyltriethoxysilane (available from the Union Carbide Company as A-1100) and provided with a nitrogen blanket. Next there is slowly added 135.6 parts of hexanediol diacrylate. The molar ratio of silane to hexanediol diacrylate is 2:1. The addition of the hexanediol diacrylate to the reaction vessel causes the contents therein to exotherm to about 45° C.

An analysis of the ungelled reaction product derived from the hydrocarbonpolyol polyacrylate, shows it to be essentially acrylyl-free, i.e., less than about 0.2 meq. per gram, and to have a 8.4 percent calculated silicon content.

EXAMPLE 2

An ungelled reaction product derived from a polyetherpolyol polyacrylate backbone is made in this example.

A reaction vessel is charged with 442 parts of gamma-aminopropyltriethoxysilane and has slowly added to it 302 parts of tetraethylene glycol diacrylate. The molar ratio of the silane to diacrylate is 2:1. The mixture is allowed to exotherm up to 38° C.

The reaction product is essentially acrylyl-free, has a calculated silicon content of 7.5 percent, and has a viscosity of 156 centipoises on a spindle no. 2 at 50 rpm's.

EXAMPLE 3

This example illustrates an ungelled resin derived from a hydrocarbonpolyol polyacrylate, i.e., trimethyolpropane triacrylate (TMPTA) and gamma-aminopropyltriethoxysilane.

A reaction vessel is charged with 550.3 parts of the silane and has added slowly to it 247.3 parts of the TMPTA. The molar ratio of silane to triacrylate is 3:1. The mixture of the two components exotherms to 33° C.

The ungelled reaction product is essentially free of acrylyl residues and has a calculated silicon content of about 8.7 percent.

EXAMPLE 4

This example illustrates the production of ungelled resin using a polyetherpolyol polyacrylate from the reaction of a triacrylate of oxyethylated trimethyolpropane (available from Ware Chemical Company as Chemlink 176) and gamma-aminopropyltriethoxysilane.

A reaction vessel is initially charged with 66 parts of the silane. Next there is slowly added 45 parts of the triacrylate. The molar ratio of silane to triacrylate is 3:1. The reaction mixture is allowed to exotherm to 50° C. and then held at 60° C. for 2 hours.

The resultant reaction product is ungelled, has a calculated silicon content of 7.5 percent, and is essentially acrylyl-free.

EXAMPLE 5

Illustrated herein is the reaction of a diacrylate (formed from 2,2 dimethyl-3-hydroxypropyl-2,2-dimethyl-3-hydroxypropionate and acrylic acid, 1:2 molar ratio) and gamma-aminopropyltriethoxysilane to produce an ungelled resin.

The silane is charged to a reaction vessel at a level of 425 parts. To the silane is next added 330.8 parts of the diacrylate. The two reactants exotherm to 64° C.

An analysis of the ungelled product shows it to be essentially acrylyl-free and having a calculated silicon content of 7.1 percent.

EXAMPLE 6

This example illustrates the use of polyurethanepolyol polyacrylate as a backbone for making the ungelled resins of this invention. The backbone is derived by initially reacting the following components:

|  | Parts |
|---|---|
| Polycaprolactone triol[1] | 1026.0 |
| Polycaprolactone diol[2] | 997.5 |
| 4,4'-methylene bisisocyanato cyclohexane[3] | 597.4 |
| Isophorone diisocyanate | 670.3 |
| 1-methyl-2-pyrolidinone | 823.1 |
| Dibutyl tin dilaurate | 0.4 |

[1]Available from Union Carbide Corp. as PCP-0310.
[2]Available from Union Carbide Corp. as PCP-0230.
[3]Available from Mobay Chemical Co. as Desmodur W.

All of the above components are charged to a reaction vessel and heated to 80° C. with stirring. A nitrogen blanket is maintained throughout the reaction. The reaction is allowed to proceed for about 20 hours. The NCO value of the reaction product at the end of the 20 hours is found to be 733.4.

2,000 parts of the above polymeric backbone is next reacted with 316 parts of hydroxyethyl acrylate in the presence of 2.0 parts 2,6-ditertiarybutyl para cresol. The reaction is allowed to proceed for about 5 hours at temperatures ranging from 78° C. to 120° C. About 0.02 parts of dibutyl tin dilaurate is now added and the reaction allowed to proceed for about another two hours.

The ungelled reaction product of this invention is made by reacting 300 parts of the polyurethanepolyol polyacrylate material to 82.5 parts of gamma-aminopropyltriethoxysilane. The molar ratio of the two reactants is 1.1:1.0.

The final reaction product has a calculated silicon content of 2.7 percent and contains essentially no acrylyl residues.

EXAMPLE 7

This example illustrates another preparation of a polyurethane polyol polyacrylate backbone suitable for further reaction with an amino silane.

A 3-liter flask is initially charged with 115 parts of 4,4'-methylene bis(isocyanato cyclohexane) (available from Mobay Chemical Company as Desmodur W), 480 parts of isophorone diisocyanate and 0.8 parts dibutyl tin dilaurate. A nitrogen blanket is now provided. Thereafter, 397 parts of a polycaprolactone triol (available from Union Carbide as PCP-0300) is added slowly to the reaction vessel. The reactants exotherm to 60° C. The nitrogen blanket is removed and an air sparge is provided. The reaction mixture is slowly heated to 73° C. over an hour's time period. The NCO content of the mixture is 330. Next, 0.1 part of 2,6-di-t-butyl-p-cresol (available from Shell Chemical Company as Ionol) and 169 parts of hydroxy ethyl acrylate is added to the reaction mixture. The aforementioned two components are slowly added over a one-hour time period while maintaining the temperature at 62°-72° C. Butyl acetate, at a level of 294 parts, is next added and the resultant mixture held at 65° C. for one hour. An analysis shows an NCO value of 780. This mixture is held at 65° C. for 8 hours while maintaining an air sparge. The NCO value at this point in the reaction is 924. The mixture has a viscosity of 7800 centipoises. Next, 169 parts of 2-ethylhexanol is added and the reaction mixture held for one hour at 65° C. After 3½ hours, the NCO value of the mixture is 7136.

Gamma-aminopropyltriethoxysilane at a level of 322 parts is added to the above reaction mixture and then held for two hours. An IR analysis shows there to be no NCO present. Additionally, the reaction product is ungelled, has a calculated silicon content of 2.4 percent and contains essentially no acrylyl residues.

EXAMPLE 8

The production of an ungelled resin based on an etherpolyol polyacrylate backbone is illustrated in this example.

Celrad 3600 (a diacrylate derived from the reaction of 2 moles acrylic acid and 1 mole of an aromatic diepoxide, available from Celanese Chem. Co.), is added to a reaction vessel containing xylene and gamma-aminopropyltriethoxysilane. The molar ratio of the silane to the Celrad 3600 is 2:1 and the xylene represents 20.6% of the mixture. A nitrogen blanket is maintained throughout the reaction. The addition of the diacrylate occurs over about 20 minutes. The reaction mixture exotherms to 46° C. A temperature of 45°-50° C. is maintained for about 1 hour and then allowed to cool. An IR of a sample shows no free acrylate present.

The reaction product has a calculated silicon content of 5.8 percent and essentially no acrylyl residues.

EXAMPLE 9

An ungelled resin based on an urethanepolyol polyacrylate backbone is made in this example.

A hydroxyethyl acrylate/caprolactone (1:2) adduct is added to a reaction vessel containing isophorone diisocyanate and provided with a nitrogen blanket. The amounts of reactants is 22.2 parts of diisocyanate and 72.2 parts of the adduct, molar ratio=1:2. The temperature of the reaction is raised to 60° C. and held there for about 1 hour. An analysis shows there to be free isocyanate present. At this point, 0.01 parts of 2,6-ditertiarybutyl-paracresol is added. The temperature of the reaction vessel is maintained at about 65° C. to 80° C. for the next 7½ hours. Substantially no free isocyanate is detected. The viscosity of the reaction mixture is 49.8 Stokes.

Ten (10) parts of the above reaction product and five (5) parts of gamma-aminopropyltriethoxysilane (1:2 mole ratio) are mixed under a nitrogen blanket. The mixture exotherms to 33° C. After about one hour hold time in a 60° C. oven, the reaction product is analyzed and found to contain essentially no vinyl keto residues.

The ungelled resin has a calculated silicon content of 4.2 percent and essentially no acrylyl residues.

EXAMPLE 10

An amidepolyol polyacrylate/aminosilane is made by the following procedure.

Initially a epsilon-caprolactone/diethanolamine triol is made by reacting epsilon-caprolactone and diethanolamine together in a 2.3:2 molar ratio at about 100° C. to a viscosity of 5.5 Stokes. The resultant triol (314.1 parts) is then mixed with acrylic acid (282.6 parts), phenothiazine (0.04 parts), hydroquinone (0.6 parts) and toluene (110.0 parts). The mixture is agitated for about 6 hours at 120° C. to produce the desired acrylate.

Next, 24 parts of the above amidepolyol polyacrylate is mixed with 25 parts of gamma-aminopropyltriethoxysilane (1:1 equivalent ratio) under a nitrogen blanket. A temperature of about 40°-45° C. is maintained for about ½ hour, followed by a temperature of about 60°-65° C. for about another ½ hour.

The ungelled resin has a calculated silicon content of 7.0 percent and essentially no acrylyl residues.

EXAMPLE 11

This example illustrates a process for making an ungelled resin using a polyesterpolyol polyacrylate.

A reaction vessel is initially charged with 44.2 parts of gamma-aminopropyltriethoxysilane and provided with a nitrogen blanket. Next, 45.0 parts of a polyester diacrylate (derived from the reaction of phthalic anhydride, diethylene glycol and acrylic acid, molar ratio=1:2:2, M.W.=450) is added to the reaction vessel. The molar ratio of the silane to the diacrylate is 2:1. The mixture exotherms to 55° C. The mixture is stirred for the next 2 hours while maintaining a temperature of 55°–60° C.

The resultant ungelled reaction product has essentially no acrylyl residues and a silicon content of 6.3 percent.

EXAMPLE 12

The ungelled reaction product of this example is based on the reaction of (1) a urethane polyol derived from a hydroxyethyl acrylate/caprolactone adduct, dimethyolpropionic acid and a diisocyanate with (2) an amino silane.

Initially, a reaction vessel equipped with stirrer, condenser and heating means is charged with 3998 parts epsilon-caprolactone, 4060 parts hydroxyethyl acrylate (HEA), 7 parts Tinuvin P catalyst (available from Ciba-Geigy Corp.), 19.8 parts p-methoxy phenol catalyst and 8 parts stannous octoate catalyst. The molar ratio of e-caprolactone to HEA is 1:1. The mixture is heated to 120° C. and maintained there for about 8 hours. An IR analysis shows no caprolactone present.

Another reaction vessel is next charged with 228.8 parts of the above caprolactone/HEA adduct, 12.2 parts dimethyolpropionic acid and 154.2 parts of 4,4'-methylene bis (isocyanato cyclohexane). The mixture is slightly heated and allowed to exotherm to 130° C. the mixture is next cooled to 93° C. and maintained there for about 9 hours. An analysis of a sample shows it to be a urethanepolyol polyacrylate having a NCO equivalent weight of 14,782 (i.e., essentially free of free isocyanate).

The ungelled reaction product of this invention is made by charging to the above reaction 110.5 parts of gamma-aminopropyltriethoxysilane. At the time of charging, the polyacrylate has a temperature of about 65° C. The reaction mixture is held for about 1½ hours at 65° C. The viscosity of the mixture is next reduced by adding 272 parts of anhydrous ethanol.

The resultant ungelled reaction product is essentially acrylyl-free and has a calculated silicon content of 2.8 percent.

EXAMPLE 13

This example shows that the ungelled reaction products previously exemplified are capable of forming durable coating films at a low temperature cure. The compositions that follow are coated onto a Bonderite 100 substrate to form a 3 mil wet film and then cured for the indicated times and temperatures. The solvent resistance of the films is checked by manually rubbing an acetone soaked cloth rag over the film until the integrity of the film is destroyed. The compositions are as follows:

| Composition (parts by weight) | A | B | C | D | E | F | G |
|---|---|---|---|---|---|---|---|
| Example 1 resin | 20 | | | | | | |
| Example 2 resin | | 10 | | | | | |
| Example 4 resin | | | 10 | | | | |
| Example 8 resin solution | | | | 20 | | | |
| Example 9 resin | | | | | 5 | | |
| Example 10 resin solution | | | | | | 10 | |
| Example 11 resin | | | | | | | 20 |
| Dibutyl tin dilaurate | 0.6 | | 0.3 | 0.4 | 0.15 | 0.3 | 0.6 |
| Tetrapropyl titanate | | 0.1 | | | | | |

All the films resulting from the above compositions are able to withstand over 100 acetone double rubs after being cured for ½ hour at 121° C., or aged for 70 hours at 25° C.

EXAMPLE 14

A coating composition is formulated as follows in parts by weight:

| Composition | A | B | C |
|---|---|---|---|
| Ungelled resin of Example 3 | 40 | 40 | 25 |
| Polyester polyol[1] | 20 | 20 | 25 |
| Dimethylethanolamine lactate catalyst | — | 1.0 | 1.0 |

[1]Made from 2 moles of neopentyl glycol and 1 mole of hexahydrophthalic anhydride. The resin has a hydroxyl number of 295 and acid number of 10.

Compositions A, B and C are drawn down on a metal substrate to form 3 mil wet films. The films are baked at 82° C. for ½ hour. All the films are capable of withstanding over 100 acetone double rubs.

EXAMPLE 15

A pigmented coated composition is formulated as follows:

| | % |
|---|---|
| Ungelled resin of Example 7 | 45.8 |
| Aluminum pigment paste | 1.7 |
| Dibutyltin dilaurate | 1.2 |
| Acetone | 15.3 |
| Mineral spirits | 10.1 |
| Toluene | 10.1 |
| Xylene | 7.7 |
| Isopropyl alcohol | 5.1 |
| Ethylene glycol monoethyl ether acetate | 2.6 |

Two primed Bonderite 40 steel substrates are coated with the above composition and either baked at 121° C. for 20 minutes or ambient cured for 24 hours to give 1.9 mil films. The films are then tested after the 24 hour time period for various properties as follows:

| | 20 degree gloss | Sward hardness | Pencil hardness | Gasoline Resistance | 20 degree gloss after 100% humidity for 96 hours |
|---|---|---|---|---|---|
| Baked film | 42 | 38 | HB | 2 | 32 |
| Air dried film | 54 | 12 | 2B | 4 | 6 |

Gasoline resistance as measured in this test is determined on a 1 to 4 scale where 1 represents no effect, 2 represents slight softening and 4 represents softening.

The above results demonstrate the good properties of the tested compositions when baked. Certain of the properties of the air dried film are only marginally acceptable after a 24 hour ambient cure; however, the properties do improve to a satisfactory level after additional ambient cure.

EXAMPLE 16

This example illustrates a pigmented coating composition using the ungelled resin of Example 12 as the film former. The composition has the following formulation:

|  | % |
|---|---|
| Ungelled resin solution of Example 12 (65% solids) | 52.3 |
| Aluminum pigment paste | 1.5 |
| Dibutyltin dilaurate | 0.4 |
| Acetone | 13.8 |
| Ethylene glycol monoethyl ether acetate | 2.3 |
| Isopropanol | 4.6 |
| Toluene | 9.1 |
| Xylene | 6.9 |
| Lactol spirits | 9.1 |

The above composition is applied to a substrate to give a 1.9 mil dry film. The coating is tack free after 2 hours of room temperature cure. After 6 days, the coating has a F pencil hardness and has excellent gasoline soak resistance.

There are described above the invention and illustrative embodiments thereof. However, within the scope of the claims, it is to be understood that the invention can be practiced otherwise than as specifically described.

What is claimed is:

1. An essentially anhydrous ungelled reaction product characterized in having a non-vinyl addition backbone being essentially acrylyl-free, having a silicon content of up to about 12 percent, and derived from the reaction of (a) a condensation product having at least 2 amine reactive acrylyl residues per molecule and (b) an amino silane of formula

where each X is independently a (1) hydrogen, (2) alkyl, aryl, or cycloalkyl group having from 1 to 10 carbon atoms, or (3)

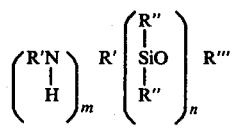

where each R' is independently an alkylene group having from 2 to 10 carbon atoms, m is from 0 to 2, each R" is independently a hydrogen, alkyl, aryl, cycloalkyl, alkoxy, or aryloxy group having from 1 to 8 carbon atoms, n is from 1 to 5 and R''' is an alkyl group having from 1 to 8 carbon atoms, with the proviso at least one X is a radical containing silicon.

2. The reaction product of claim 1 wherein the condensation product is selected from the group consisting of a hydrocarbonpolyol polyacrylate, saturated polyesterpolyol polyacrylate, alkydpolyol polyacrylate, urethanepolyol polyacrylate, polyurethanepolyol polyacrylate, amidepolyol polyacrylate, polyamidepolyol polyacrylate, etherpolyol polyacrylate, polyetherpolyol polyacrylate, and mixtures thereof.

3. The reaction product of claim 2 having an acrylyl content of less than about 0.2 meq. per gram.

4. The reaction product of claim 3 wherein the reaction product has an acrylyl content of less than about 0.1 meq. per gram and a silicon content of from about 0.5 percent to about 10 percent.

5. The reaction product of claim 4 wherein the condensation product is a hydrocarbonpolyol polyacrylate.

6. The reaction product of claim 4 wherein the condensation product is a saturated polyesterpolyol polyacrylate.

7. The reaction product of claim 4 wherein the condensation product is an alkydpolyol polyacrylate.

8. The reaction product of claim 4 wherein the condensation product is a urethanepolyol polyacrylate.

9. The reaction product of claim 4 wherein the condensation product is a polyurethanepolyol polyacrylate.

10. The reaction product of claim 4 wherein the condensation product is an amidepolyol polyacrylate.

11. The reaction product of claim 4 wherein the condensation product is a polyamidepolyol polyacrylate.

12. The reaction product of claim 4 wherein the condensation product is an etherpolyol polyacrylate.

13. The reaction product of claim 4 wherein the condensation product is a polyetherpolyol polyacrylate.

14. The reaction product of claims 5, 6, 7, 8, 9, 10, 11, 12, or 13 characterized in having an acrylyl content of less than about 0.01 meq. per gram and having a silicon content of from about 2 percent to about 9 percent.

15. The reaction product of claims 1 or 4 wherein the amino silane has the formula

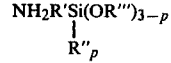

where p is from 0 to 2, and R" is an alkyl, aryl, alkoxy or aryloxy group.

16. The reaction product of claim 15 wherein p is 0.

17. The reaction product of claim 16 wherein the amino silane has an alkylene linkage of from 2 to 5 carbon atoms and R''' is independently methyl or ethyl.

18. The reaction product of claim 17 wherein the amino silane is gamma-aminopropyltrimethoxyslane, gamma-aminopropyltriethoxysilane or a mixture thereof.

19. The reaction product of claim 1 further characterized in being capable of curing at a temperature of less than about 150° C.

20. The reaction product of claim 19 characterized in being capable of curing at a temperature of less than about 50° C.

21. A coating composition consisting essentially of (1) from about 30 percent to about 95 percent of an essentially anhydrous reaction product characterized in having a non-vinyl addition backbone being essentially acrylyl-free, having a silicon content of up to about 12 percent, and derived from the reaction of (a) a condensation product having at least 2 amine reactive acrylyl residues per molecule and (b) an amino silane of formula

where each X is independently a (1) hydrogen, (2) alkyl, aryl, or cycloalkyl group having from 1 to 10 carbon atoms, or (3)

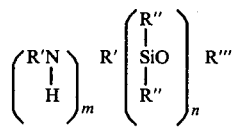

where each R' is independently an alkylene group having from 2 to 10 carbon atoms, m is from 0 to 2, each R" is independently a hydrogen, alkyl, aryl, cycloalkyl, alkoxy, or aryloxy group having from 1 to 8 carbon atoms, n is from 1 to 5 and R''' is an alkyl group having from 1 to 8 carbon atoms, with the proviso at least one X is a radical containing silicon and (2) the balance organic solvent, pigment, or a mixture thereof.

22. The coating composition of claim 21 wherein the condensation product is selected from the group consisting of a hydrocarbonpolyol polyacrylate, saturated polyesterpolyol polyacrylate, alkydpolyol polyacrylate, urethanepolyol polyacrylate, polyurethanepolyol polyacrylate, amidepolyol polyacrylate, polyamidepolyol polyacrylate, etherpolyol polyacrylate, polyetherpolyol polyacrylate, and mixtures thereof.

23. The coating composition of claim 22 wherein the ungelled reaction product has an acrylyl content of less than about 0.2 meq. per gram.

24. The coating composition of claim 23 wherein the ungelled reaction product has an acrylyl content of less than about 0.1 meq. per gram and a silicon content of from about 0.5 percent to about 10 percent.

25. The coating composition of claim 24 wherein the condensation product is a hydrocarbonpolyol polyacrylate.

26. The coating composition of claim 24 wherein the condensation product is a saturated polyesterpolyol polyacrylate.

27. The coating composition of claim 24 wherein the condensation product is an alkydpolyol polyacrylate.

28. The coating composition of claim 24 wherein the condensation product is a polyurethanepolyol polyacrylate.

29. The coating composition of claim 24 wherein the condensation product is a urethanepolyol polyacrylate.

30. The coating composition of claim 24 wherein the condensation product is an amidepolyol or a polyamidepolyol polyacrylate.

31. The coating composition of claim 24 wherein the condensation product is an etherpolyol polyacrylate.

32. The coating composition of claim 24 wherein the condensation product is a polyetherpolyol polyacrylate.

33. The coating composition of claims 25, 26, 27, 28, 29, 30, 31 or 32 wherein the ungelled reaction product has an acrylyl content of less than about 0.01 meq. per gram and has a silicon content of from about 2 percent to about 9 percent.

34. The coating composition of claims 21 or 24 wherein the amino silane used to make the ungelled reaction product has the formula

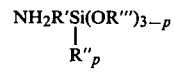

where p is from 0 to 2, and R" is an alkyl, aryl, alkoxy or aryloxy group.

35. The coating composition of claim 34 wherein p is 0.

36. The coating composition of claim 35 wherein the amino silane has an alkylene linkage of from 2 to 5 carbon atoms and R''' is independently methyl or ethyl.

37. The coating composition of claim 36 wherein the amino silane is gamma-aminopropyltrimethoxysilane, gamma-aminopropyltriethoxysilane or a mixture thereof.

38. The coating composition of claim 21 further characterized in being capable of curing at a temperature less than about 150° C.

39. The coating composition of claim 38 additionally consisting essentially of a polyol.

40. The coating composition of claim 39 wherein the ungelled reaction product represents, on a film-forming solids basis, from about 10 percent to about 90 percent of the composition and the polyol from about 10 percent to about 90 percent of the composition.

41. The coating composition of claim 40 wherein ungelled reaction product represents, on a film-forming solids basis, from about 40 percent to about 90 percent of the composition and the polyol from about 10 to about 60 percent of the composition.

42. The coating composition of claim 41 further characterized in being capable of curing at a temperature of less than about 50° C.

43. The coating composition of claim 42 having an organic solvent content of from about 10 percent to about 50 percent.

44. The coating composition of claim 43 additionally consisting essentially of an aminoplast resin.

* * * * *